(12) United States Patent
Tulip

(10) Patent No.: US 11,391,667 B2
(45) Date of Patent: Jul. 19, 2022

(54) LASER GAS ANALYZER

(71) Applicant: Boreal Laser Inc., Edmonton (CA)

(72) Inventor: John Tulip, Edmonton (CA)

(73) Assignee: Boreal Laser Inc., Edmonton (CA)

( * ) Notice: Subject to any disclaimer, the term of this patent is extended or adjusted under 35 U.S.C. 154(b) by 470 days.

(21) Appl. No.: 15/910,964

(22) Filed: Mar. 2, 2018

(65) Prior Publication Data
US 2019/0271640 A1    Sep. 5, 2019

(51) Int. Cl.
*G01N 21/25* (2006.01)
*G01N 21/39* (2006.01)

(52) U.S. Cl.
CPC .......... *G01N 21/255* (2013.01); *G01N 21/39* (2013.01); *G01N 2021/399* (2013.01)

(58) Field of Classification Search
CPC .......... G01N 2021/399; G01N 21/255; G01N 21/39; G01N 2021/3595; G01J 3/2823; G01J 2003/2826; G01J 3/4535; G01J 3/32; G01J 3/45
See application file for complete search history.

(56) References Cited

U.S. PATENT DOCUMENTS

| | | | | |
|---|---|---|---|---|
| 7,145,165 B2* | 12/2006 | Cox | ...................... | G01N 21/05 250/573 |
| 7,939,805 B2* | 5/2011 | Shaw | ...................... | G01J 3/0256 250/339.08 |
| 8,145,064 B2* | 3/2012 | Majewski | ................ | G01J 3/42 398/158 |
| 9,681,798 B2* | 6/2017 | Hunter | ................ | A61B 1/0638 |
| 2004/0218639 A1* | 11/2004 | Oh | ...................... | H01S 5/06258 372/20 |
| 2004/0228384 A1* | 11/2004 | Oh | ...................... | H01S 5/1228 372/96 |
| 2010/0108886 A1* | 5/2010 | Shaw | .................... | G01J 3/0245 250/339.08 |
| 2011/0176138 A1* | 7/2011 | Khalil | ............... | G01B 9/02091 356/452 |

(Continued)

OTHER PUBLICATIONS

Bomse, D.S., et al., "Frequency Modulation and Wavelength Modulation Spectroscopies: Comparison of Experimental Methods Using a Lead-Salt Diode Laser," 31(6): 718-731, Feb. 1992.

(Continued)

*Primary Examiner* — Violeta A Prieto
(74) *Attorney, Agent, or Firm* — Christensen O'Conner Johnson Kindness PLLC

(57) ABSTRACT

A method of suppressing retroreflector fringe noise in TDL spectrometers (TDLS) that use a laser and retroreflector. The path between the laser and each retroreflector element is changed mechanically for example by using a movable support for the retroreflector. The phase of light reaching the retroreflectors is very sensitive to the pathlength. A pathlength change of a fraction of the light wavelength will significantly change the phase of the light. In this method the pathlength to each retroreflector is modulated by mechanical means and this modulation is both stronger and faster than atmospheric effects on phase. If mechanical modulation occurs at a sufficiently high frequency retroreflector fringe noise can be averaged by integration of the spectrometer output over a reading period of typically one second.

18 Claims, 2 Drawing Sheets

(56) References Cited

U.S. PATENT DOCUMENTS

| | | | |
|---|---|---|---|
| 2014/0375989 A1* | 12/2014 | Schachinger | G01N 21/15 |
| | | | 356/300 |
| 2015/0292944 A1* | 10/2015 | Tian | G01J 3/28 |
| | | | 356/454 |
| 2016/0066775 A1* | 3/2016 | Hunter | G01J 3/1256 |
| | | | 600/178 |
| 2016/0329681 A1* | 11/2016 | Tulip | H01S 5/02415 |
| 2017/0115218 A1* | 4/2017 | Huang | G01S 17/06 |

OTHER PUBLICATIONS

Masiyano, D., "Use of Diffuse Reflections in Tunable Diode Laser Spectroscopy," PhD thesis, Cranfield University, United Kingdom, 2009, pp. 1-269.

Murty, S.S.R, and J.W. Bilbro, "Atmospheric Effects on CO2 Laser Propagation," National Aeronautics and Space Administration, Nov. 1978, pp. 1-108.

Silver, J.A., and A.C. Stanton, "Optical Interference Fringe Reduction in Laser Absorption Experiments," Applied Optics 27(10): 1914-1916, May 1988.

Webster, C.R., "Brewster-Plate Spoiler: A Novel Method for Reducing the Amplitude of Interference Fringes that Limit Tunable-Laser Absorption Sensitivities," J. Opt. Soc. Am. B 2(9): 1464-1470. Sep. 1985.

\* cited by examiner

C3H4OOP-90001 Concentration in ppmm (June 6, 2017)

LASER GAS ANALYZER

FIELD OF THE INVENTION

This invention in general relates to gas monitors used, for example, for environmental atmospheric monitoring. In particular this invention relates to improvements in detection and measurement of gas concentrations and gas emissions based on tunable diode lasers.

BACKGROUND

Accurate monitoring of gaseous species at low concentrations is required for a wide range of industrial, regulatory, and academic fields. The most common include atmospheric chemistry, pollution monitoring, industrial process monitoring and control, safety, breath analysis, and agricultural research. One of the most reliable principles for continuous monitoring of gases is the measurement of gas absorption since most gases have one or more absorption lines in the ultra violet, visible or the infrared part of the spectrum. This technique is known as absorption spectroscopy. With this method a beam of light such as a laser beam that is absorbed by the gas of interest, is directed through the gas or a mixture of gases. The degree of absorption of the light beam is then used as an indicator for the concentration of the gas to be detected. Many different spectroscopic techniques exist, but the use of single line spectroscopy utilizing single mode tunable diode lasers is probably the one giving best sensitivity and selectivity due to its high spectral resolution involving a low risk of interference from other gases.

There are two popular spectroscopic methods of laser gas detection. In one the frequency of the laser is rapidly scanned across the gas absorption line by modulation of the laser diode current. Gas absorption results in modulation of the amplitude of the transmitted light and this amplitude can be measured using a photodetector and some simple electronics. The absorption of the laser beam on-line and off-line may be compared and the gas absorption and concentration computed. This is method is referred to by several names including scanned direct absorption and rapid scan absorption. This method has the advantage of simplicity but it can be difficult to establish a zero-absorption baseline. The other popular method is called modulation spectroscopy; the most commonly used is referred to as wavelength modulation spectroscopy (WMS).

In this method the laser frequency and amplitude are modulated using laser current as in the case of direct absorption. In addition, the laser current is also modulated at a second relatively high frequency. Gas absorption distorts the amplitude of the modulated laser light so that harmonics of the high modulation frequency appear after the beam has passed through a gas. These harmonics are measured by demodulating the gas signal. Sensitive tunable diode laser (TDL) absorption measurements have been performed for decades with wavelength modulation spectroscopy (WMS) for a wide variety of practical applications. With its better noise-rejection characteristics through laser wavelength modulation strategies, WMS has long been recognized as the method of choice for sensitive measurements of small values of absorption, and thus is favored for trace species detection.

A common safety or environmental application of TDL spectroscopy is perimeter monitoring of industrial sites where line of sight laser beams surround the site. Releases of gas into the atmosphere from the site pass through the downwind perimeter and are recorded by the laser analyzer. For gases such as methane normally present in the atmosphere the instrument can compare the average concentration along the upwind and downwind perimeters and calculate the contribution of gas by the site. Industrial perimeter monitoring is characterized by long open path lengths, often hundreds of meters in length.

It is well known that that the detection sensitivity of TDL WMS spectroscopy is limited by interference fringes and not by the theoretical limit given by detector noise [Silver]. The interference fringes stem from Fabry-Perot etalons between reflecting or scattering surfaces of optical elements, optical fibre end faces, and components of multipass cells [Masiyano] An early quantitative analysis of the effects of interference fringes on detection sensitivity was carried out by [Reid]. In their study, the authors estimated that they could improve the detection sensitivity by at least a factor of 5 if they could eliminate the fringe interference.

The sensitivity of TDL spectroscopy is further reduced over long open paths by atmospheric effects. Atmospheric gases can cause absorption that overlap with the absorption of the target gas and cause interference that degrades detection sensitivity. Moreover, atmospheric turbulence will also degrade detection sensitivity. The optical effects of atmospheric turbulence on laser beams are produced by the variations of refractive index along the path of the laser beam because of fluctuations of the direction, phase, and intensity of the laser wavefront [Murfy]. These changes in the refractive index are caused by temporal and spatial fluctuations of temperature which arise in turbulent mixing of various thermal layers. Temporal and spatial variations of the beam wavefront cause the beam to wander and spread and scintillate in a manner familiar to astronomers.

If the scale size of the inhomogeneity is much larger than the diameter of the laser beam, the entire beam is bent away from the line-of-sight and results in beam wander or beam steering where the beam executes a two-dimensional random walk in the receiver plane. Inhomogeneities of the size of the beam diameter act as weak lenses on the whole or parts of the beam with a small amount of steering and spreading. When the inhomogeneities are much smaller than the beam diameter, small portions of the beam are independently diffracted and refracted and the phase front becomes corrugated. The propagation of the distorted phase front causes constructive interference over some parts of the receiver and destructive interference over others, leading to alternate bright and dark areas. The locations of these bright and dark regions change temporally and lead to scintillation. Since the atmosphere consists of inhomogeneities of all sizes, the laser beam experiences fluctuations of beam size, beam position, and intensity distribution within the beam simultaneously. The relative importance of these effects depends on the path length, strength of turbulence, and the wavelength of the laser radiation.

Line of sight TDL gas analyzers are configured either as transmitter-receivers, also referred to as bi-static, or transceivers where the transmitter and receiver are combined and retroreflectors [Cerex] are used to reflect the laser beam back to the instrument. The transceiver is also referred to as mono-static detection. For infrared laser wavelengths hollow retroreflectors are used. Because of practical optical limitations the laser path length of a transmitter-receiver is limited to path lengths of approximately 100 m or less. Transceivers with a single retroreflector are also limited to approximately 100 m or less. An array of multiple retroreflectors is required for path lengths greater than 100 m, Both TDL line of sight gas detection and long, path Fourier-transform infrared spectroscopy (FTIR) gas detection require a retroreflector array [Cerex]. Unlike a FTIR analyzer, however, lasers are coherent. Laser light from each element of an array is projected back onto the receiver aperture where optical interference between the collected laser light beams can reduce the instrument's gas detection signal to noise ratio.

TDL WMS spectroscopy is well known to be sensitive to interference fringes of all types in the laser beam. Over an open atmospheric path these fringes may be caused by path optics such as retroreflectors and by atmospheric turbulence. Because the fabrication of retroreflectors is imperfect, distortion of the reflected laser beam wavefront will result in interference fringes in the laser beam. For long paths where an array of retroreflectors is deployed the path between the laser and each element of the retroreflector array has a randomly fluctuating atmospheric refractive index and this results in random fluctuations of phase of light reaching each element. Small phase differences in the light reflected by each element of the retroreflector array cause a complex interference fringe pattern at the receiver aperture and consequently atmospherics cause fringe fluctuation in the received light. This is manifest as a temporal fluctuation of WMS signal referred to as fringe noise. Fringe noise from a retroreflector array usually dominates the total noise in a long atmospheric open path laser spectrometer and is typically ten times greater than all other noise sources combined. Retroreflector fringe noise reflects the frequency spectrum of atmospheric turbulence and this depends upon atmospheric conditions. The frequencies of atmospheric fluctuations, however, are typically below 1 KHz.

Mechanical methods of averaging out the interference fringes by varying the beam path length with an external device have also been proposed. [Bomse], for example, suppressed etalon interference from a Herriott cell by longitudinal dithering the mirrors with a piezoelectric transducer. [Webster] used a vibrating Brewster-plate to suppress optical fringes by a factor of 30 in a single pass absorption cell. [Chou] achieved a 20-fold reduction in fringe amplitude by using a mirror mounted on a speaker driven at audio frequencies.

Mechanical movement of optics is commonly used to reduce laser speckle in laser projection systems. Light reflected by an optically rough surface is scattered in random directions dictated by the topography of the surface. When the rough surface is illuminated by a laser, light reflected by surface features interfere and forms a grainy stationary interference pattern known as speckle. Speckle, which reduces the image resolution of laser projectors, may be suppressed by reducing the coherence of the projected laser beam with an optical diffuser [Jui-Wen]. More effective speckle suppression achieved by rotating the optical diffuser is used in commercial laser projectors [Bodkin]. [Masiyano] used this method successfully to reduce speckle in a TDL gas sensor.

SUMMARY OF THE INVENTION

In this invention we disclose a new method of suppressing retroreflector fringe noise in TDL spectrometers (TDLS). According to this method the path between the laser and each retroreflector element is changed mechanically for example by using a movable support for the retroreflector. The phase of light reaching the retroreflectors is very sensitive to the pathlength. A pathlength change of a fraction of the light wavelength will significantly change the phase of the light. In this method the pathlength to each retroreflector is modulated by mechanical means and this modulation is both stronger and faster than atmospheric effects on phase.

If mechanical modulation occurs at a sufficiently high frequency retroreflector fringe noise can be averaged by integration of the spectrometer output over a reading period of typically one second. Since this induced retroreflector noise is stochastic it can be averaged down into insignificantly small amplitude. Surprisingly, lower frequency atmospheric fringe noise also disappears under these conditions of mechanical modulation.

In one embodiment of this invention each of the retroreflector elements is mounted on a piezo-electric element activated by remote voltage source or other translating element. The frequency of the piezo voltage is typically several hundred hertz and is designed so that neither the frequency or phase of each element is related.

In another embodiment the laser beam is reflected from an electrical scanner and the beam is periodically deflected across the retroreflector array at a frequency of hundreds of Hertz.

In the preferred embodiment of this invention the retroreflector array is rotated on the axis of the beam path. Each element of the array performs a circular excursion around the axis of rotation and the laser beam falling on any location of the array now experiences moving retroreflectors as they perform this excursion. Each retroreflector reflects light onto the receiver aperture from different locations in the illuminating beam and repeats this every rotation cycle. In this method the beam pathlength is modulated randomly with time and this modulation is both stronger and faster than atmospheric effects on phase. The required speed of rotation of the array needed to suppress fringe noise varies with pathlength and ambient conditions and is typically several hundred RPM.

BRIEF DESCRIPTION OF DRAWINGS

There will now be described embodiments of the invention with reference to the drawings by way of example, in which.

DESCRIPTION OF THE PREFERRED EMBODIMENT

Figure 1:
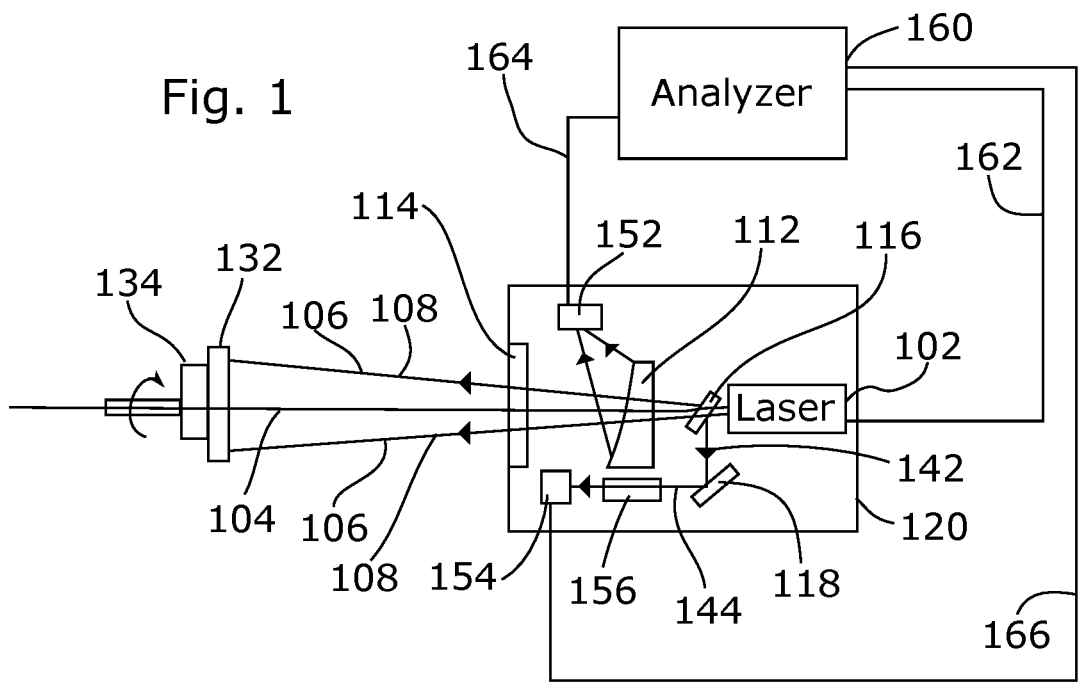
FIG. 1 is a functional schematic of an embodiment of the invention.

The FIG. 1 is a functional schematic of an embodiment of the invention that uses as a source of electromagnetic radiation a laser 102 for example a laser that is suitable for tunable diode laser spectroscopy. This includes lasers known in the art as distributed feedback (DFB), quantum cascade laser (QCL), and external cavity laser (ECL). The wavelength of the laser is chosen to coincide with absorption of the target gas. In this example the laser may be a continuous wave QCL that emits an average of 100 mw of light in the vicinity of 10 um for detection of the target gas Acrolein. The laser 102 may be contained in an HHL (high heat load) package that also contains a collimating lens and the necessary cooling means. Electrical power and controls are provided by an analyzer 160 to the laser 102 via at least one conductor 162 or other suitable means. The laser 102 and other optics including focusing optics 112, window 114, beam splitter 116, and mirror 118 are contained in an externally mounted enclosure 120. Light 106 from the laser 102 is transmitted out of the enclosure through window 114.

Window 114 should be transparent at the laser wavelength and designed to minimize etalon fringes as is well known in the art. In this example the window material may be ZnSe, it is coated to be transmissive at 10 um and is angled at 10 degrees from the laser axis 104 and is 3" in diameter.

Light 106 from the laser 102 propagates along an open path to a remote retroreflector array 132. The retroreflector array 132 may be any suitable retro-reflector array such as is available commercially from suppliers such as the Newport Corporation or PLX Inc. The choice of retroreflector element material and the size and number of elements in the array depend upon such factors as the laser wavelength and beam divergence and the length of the path from the laser to the retroreflector array. The array may be made up of two or more retroreflectors. The design of the retroreflector array could be made by one skilled in the art.

In this example the retroreflector array 132 may be made up from 27 hollow 2" corner cubes and the length of the path is 300 m. The array may be mounted on rotator 134 which is typically a DC motor. In this example the array is mounted on a DC pancake motor and the rotation speed could be 100 rpm to 3000 rpm and may be operated at 200 rpm. Light 108 reflected from the retroreflector array 132 propagates back through window 114 and is focused onto a first photodetector 152 by focusing optics 112. The design of the focusing optics 112 may be made by anyone skilled in the art. In this example the focusing optic is a 2" off axis parabolic mirror with a focal length of 2" The first photodetector 112 should be sensitive to the wavelength of the laser light and could be chosen by one skilled in the art. In this example the first photodetector 112 is mid infrared TEC cooled Mercury Cadmium Telluride detector. Photocurrents from this detector are coupled to the analyzer 160 through coaxial cable 164 or other suitable communications channels such as wireless signals.

A portion of the laser beam 142 from laser 102 is reflected by beam splitter 116 and mirror 118 through a sealed gas reference cell 156 onto a second photodetector 154. The sealed gas reference cell 156 may be of conventional design. In this example the reference cell 156 is fabricated from a Silica tube and Calcium Fluoride windows are bonded to the two ends of the cell. The target gas in the cell may be Acrolein and is used to regulate the laser wavelength. Photocurrent flows from the second detector 154 to the analyzer 160 through the coaxial cable 166 or other suitable communications channels such as wireless signals. The analyzer 160 uses photocurrents from the first photodetector 152 and second photodetector 154 to compute gas target concentration in the open path in a way well known in the art. In this example the computation algorithm is wavelength modulation spectroscopy.

Figure 2:
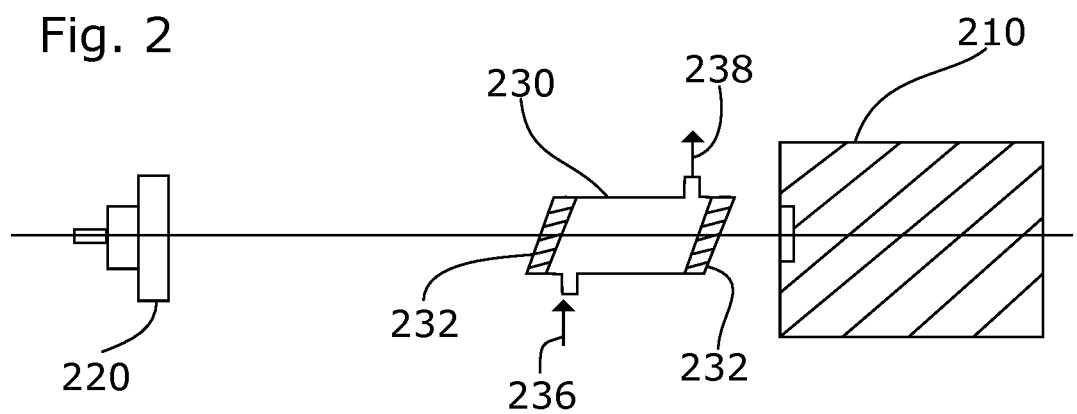
FIG. 2 is a functional schematic of a test gas absorption cell.

FIG. 2 is a schematic of a testing apparatus. An analyzer 240 built using the teachings of this invention was used with a 250 m path to the retroreflector array 220. A gas absorption cell 230 with windows 232 was placed in the beam path 204. Target gas flow into the cell 236 and gas flow out of the cell 238 were turned on and off over a test period of several hours. Over periods when the target gas was turned off nitrogen flowed through the cell. Retroreflector rotation was also activated and deactivated over the course of this several hours test.

Figure 3:
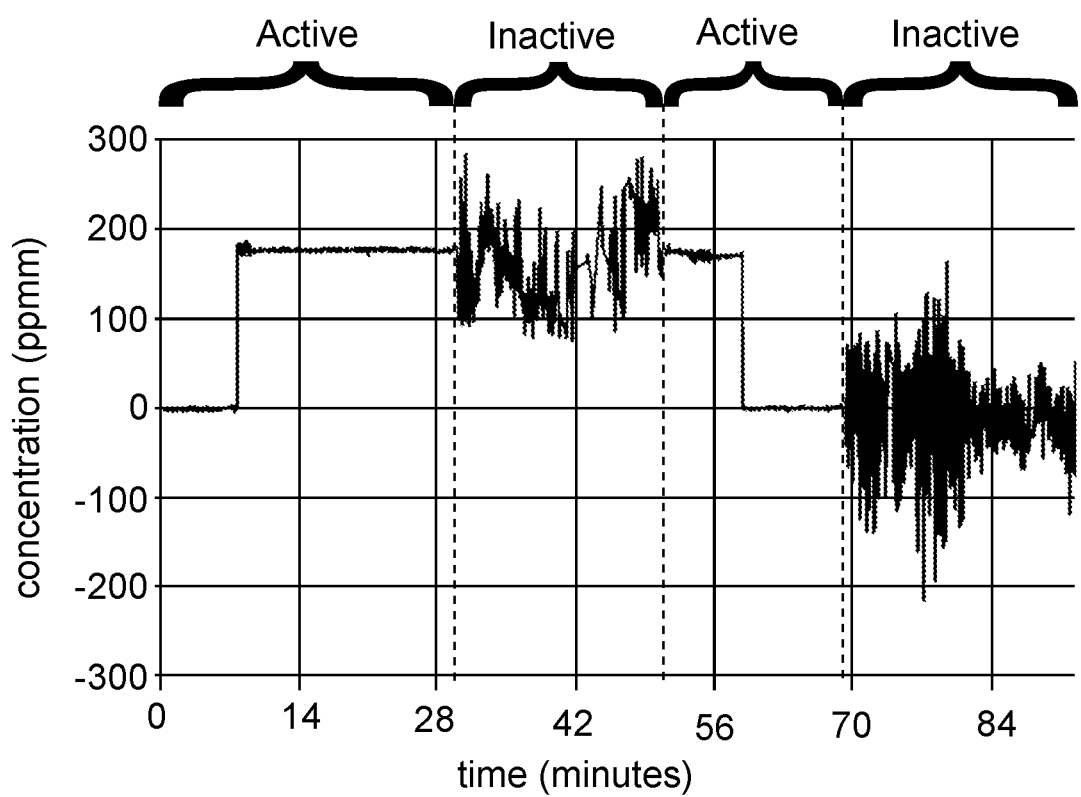
FIG. 3 illustrates the use of this invention to reduce analyzer noise.

FIG. 3 shows the output of the gas analyzer over the course of this test. Retroreflector rotation dramatically reduced analyzer noise both with target gas and nitrogen in the absorption cell.

It was found that the embodiment of FIG. 1 reduced atmospherically induced noise in TDLS gas sensors, provided improved sensitivity of a long open path TDLS gas sensor reduced degradation of accuracy and precision, while using a simple method to reduce atmospherically induced noise.

Immaterial changes may be made to what is disclosed without departing from what is claimed. In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described

The invention claimed is:

1. A spectrometer, comprising:
   a coherent laser light source comprising a tunable diode laser having coherent laser output, the coherent laser light source being configured to modulate a frequency of the coherent laser output;
   a photodetector arranged to receive the laser output after passage of the coherent laser output along a path having a path length;
   a retroreflector array in the path between the laser and the photodetector, the retroreflector array being movable to modulate the path length at a speed selected to suppress fringe noise; and
   a laser analyzer configured for coupling to the photodetector to receive and analyze signals from the photodetector.

2. The spectrometer of claim 1 in which the retroreflector array is mounted on a movable support.

3. The spectrometer of claim 2 in which the movable support comprises a rotator.

4. The spectrometer of claim 2 in which the movable support comprises a translator.

5. The spectrometer of claim 1 in which the laser analyzer is configured to average signals received from the photodetector over a time period.

6. The spectrometer of claim 5 in which the time period is selected to reduce noise created by the retroreflector array.

7. The spectrometer of claim 5 in which the time period is selected to reduce atmospheric fringe noise.

8. The spectrometer claim 1 further comprising:
   a reference path containing a reference gas and a reference photodetector;
   a splitter on the path, the splitter arranged to direct the laser output to the photodetector and to the reference photodetector; and
   the laser analyzer being configured for coupling to the photodetector and to the reference photodetector to receive signals from the photodetector and the reference photodetector.

9. The spectrometer of claim 1 in which the retroreflector array is separated from the tunable diode laser by a part of the path being an open atmospheric path.

10. The spectrometer of claim 1 in which the laser analyzer is configured to analyze the signals from the photodetector according to wavelength modulation spectrometry.

11. A method of noise suppression in a tunable diode laser spectrometer, the method comprising:
    directing coherent laser output from a coherent laser light source comprising a tunable diode laser to a photodetector along a path having a path length and modulating a frequency of the coherent laser output, the photodetector being coupled to an analyzer to provide photodetector output to the analyzer;

modulating the path length by moving a retroreflector array in the path at a speed selected to suppress fringe noise; and the analyzer averaging output from the photodetector over a time period.

12. The method of claim 11 in which moving the retroreflector array comprises rotating the retroreflector array.

13. The method of claim 11 in which moving the retroreflector array comprises translating the retroreflector array.

14. The method of claim 11 in which the time period is selected to reduce noise created by the retroreflector array.

15. The method of claim 11 in which the time period is selected to reduce atmospheric fringe noise.

16. The method of claim 11 in which the analyzer is coupled to a reference photodetector to receive and analyze photodetector output produced by laser output that has travelled along a reference path containing a reference gas.

17. The method of claim 11 in which the retroreflector array is separated from the tunable diode laser by a part of the path being an open atmospheric path.

18. The method of claim 11 further comprising the analyzer analyzing the photodetector output according to wavelength modulation spectrometry.

* * * * *